Nov. 10, 1942.  E. DAVIS  2,301,803
METHOD AND APPARATUS FOR RECOVERING LIQUID
Filed Aug. 19, 1939  2 Sheets-Sheet 1

INVENTOR.
ERNEST DAVIS
BY Bohleber & Ledbetter
ATTORNEYS.

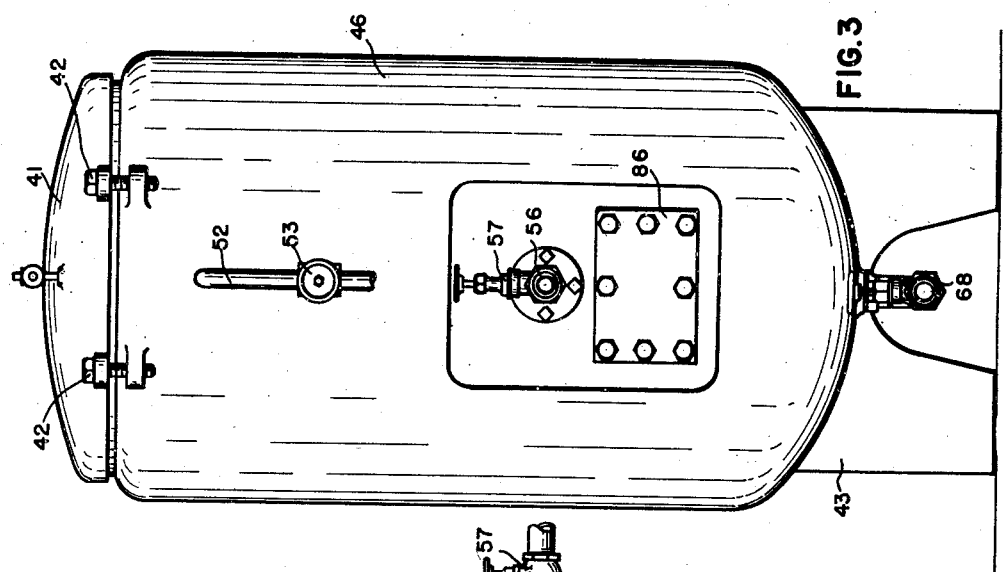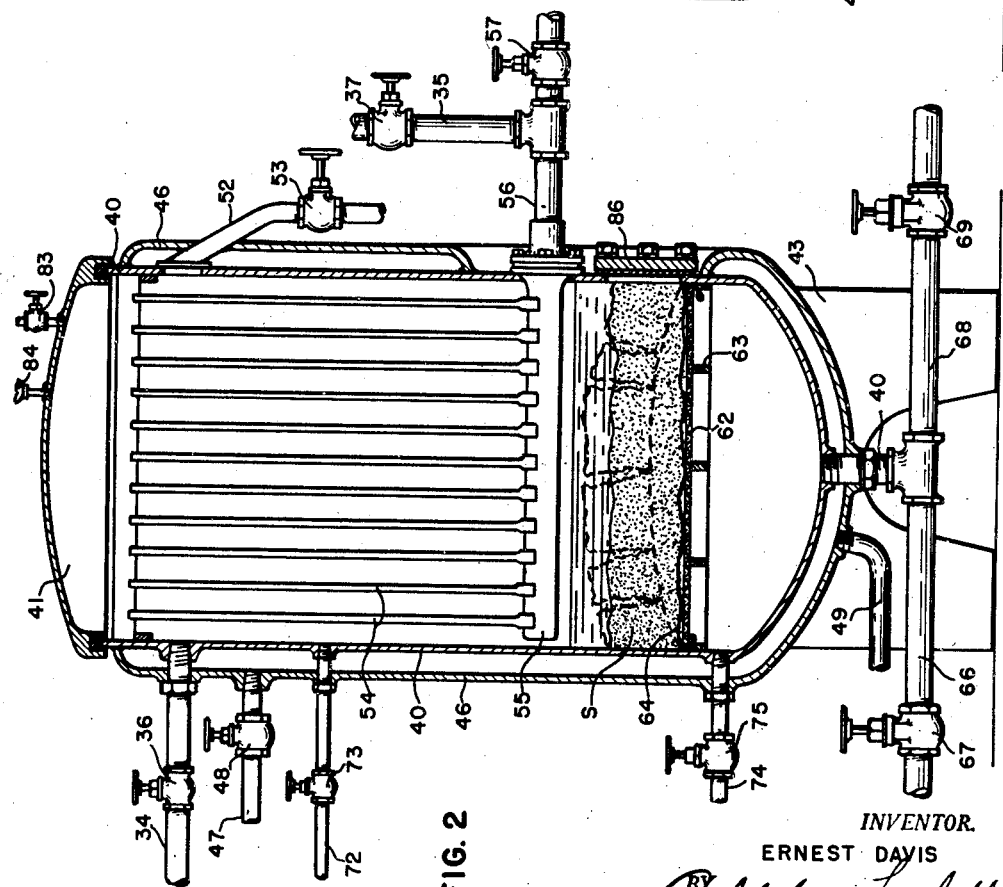

Patented Nov. 10, 1942

2,301,803

UNITED STATES PATENT OFFICE 2,301,803

METHOD AND APPARATUS FOR RECOVERING LIQUID

Ernest Davis, Syracuse, N. Y., assignor to The Prosperity Company, Inc., Syracuse, N. Y., a corporation of New York Application August 19, 1939, Serial No. 290,957

19 Claims. (Cl. 210—190)

The invention relates to a method of reclaiming liquid which is mixed with the dirt and debris, or so-called sludge which has been removed from liquid in passing through a filter. The method has particular application with high cost liquids such as a solvent used in the dry cleaning of clothes and the like. The sludge within the filter is usually an accumulation from several or many filterings of the liquid or dry cleaning solvent and in its wet state generally holds a considerable quantity of solvent after the solvent has been removed or drained from the filter.

The invention also relates to a new combination of a dry cleaning machine and a filter in which certain parts have application to the reclaiming of solvent in the dry cleaning process and also to the reclaiming of solvent which would otherwise be lost as a consequence of the filtering process. The invention further relates to the filter alone, or not in combination with the dry cleaning machine, which has general applicability, although it is described in connection with the filtering of a dry cleaning solvent.

An object of this invention is to provide a method for reclaiming, from the filter of a dry cleaning system, a liquid, such as a dry cleaning solvent, which is absorbed in the sludge which accumulates in the filter from continuous filtration of the liquid to remove dirt and debris therefrom.

Another object of the invention is to reclaim solvent absorbed in the sludge in a filter by vaporizing the same and then reclaiming the solvent by condensing the solvent vapor which has been reclaimed from the sludge.

Another object of the invention is to construct a new and novel filter which enables a liquid, such as a dry cleaning solvent, to be easily and effectively recovered from the sludge within the filter and which recovery renders the filter more easily cleaned.

Another object of the invention is to construct a new combination of dry cleaning machine and filter by which the condenser, heater, and blower of the dry cleaning machine, or any one of these parts, are used in reclaiming solvent from the filter, thereby obtaining double use thereof and avoiding the need to supply separate parts for both pieces of apparatus.

A still further object is to provide a new method of reclaiming solvent from a filter, and a dry cleaning machine used therewith.

Other objects of the invention will be more apparent from the following description taken in connection with the accompanying drawings, illustrating a preferred embodiment of the invention, in which:

Figure 2 is a sectional view through a steam jacketed filter arranged for solvent reclamation from the accumulated sludge in the filter and for drying out the sludge, filter casing and filtering means. The pipe connections with the filter are also shown.

Figure 3 is an outside elevation of the filter shown in Figure 2 and illustrates the clean-out door or opening for access to the sludge bed in the filter.

Figure 1:
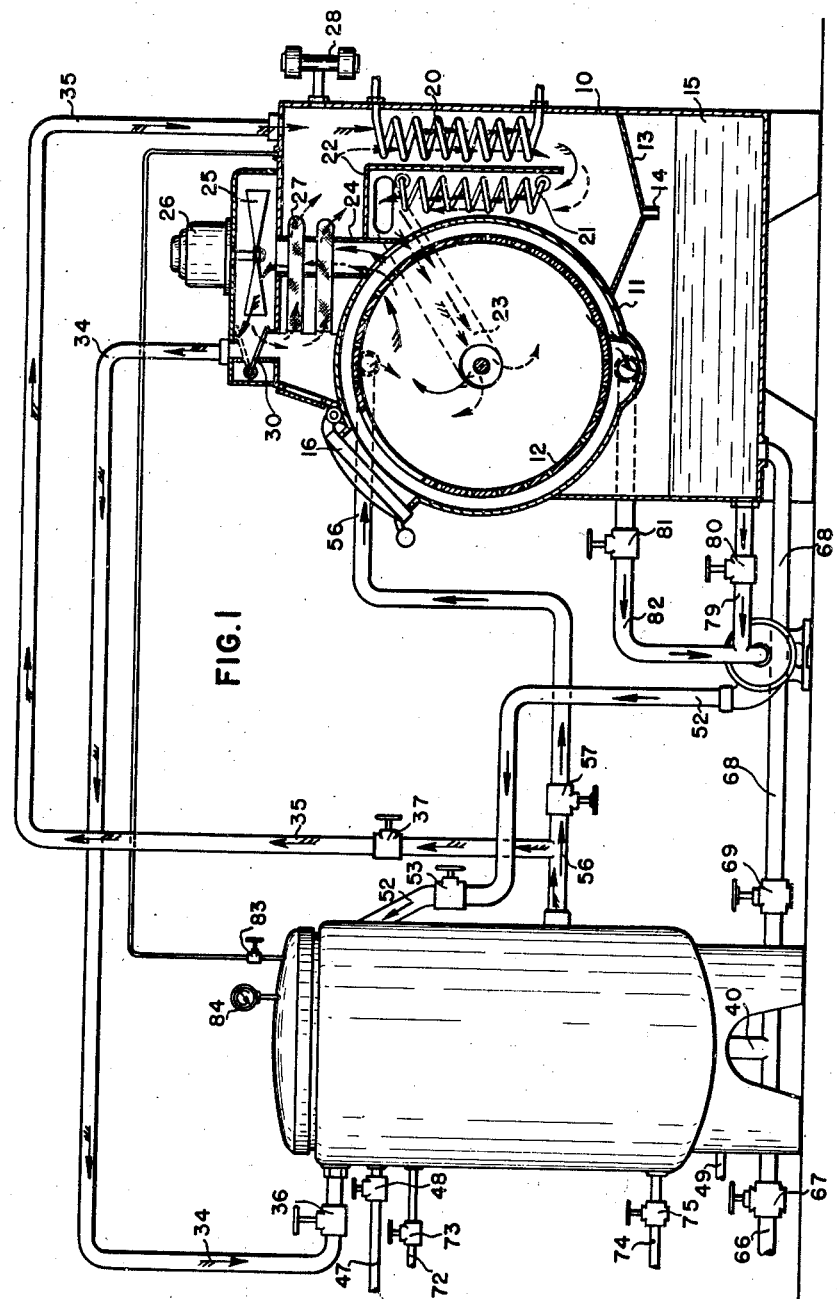
Figure 1 illustrates the filter connected with a dry cleaning machine, the latter being in cross section to show the blower, condensing means and heating means of the dry cleaning machine which are also used for the reclamation of solvent from the filter.

In dry cleaning clothes and the like, a solvent such as perchlorethylene is used which is very efficacious in removing the wide variety of kinds of dirt, grease and the like, which soil garments and clothes that cannot be washed or are not as effectively cleaned with soap and water. The solvent used in the cleaning operation has greater affinity to absorb grease, dirt, etc., when treated or mixed with a filter aid such as fuller's earth. To properly cleanse the garments in a dry cleaning machine, the solvent is continually being cleaned by circulating it through a filter, where the dirt, grease and filter aid are deposited on the filter bags or screens, the filter aid aiding the removal of dirt and grease in the filter. The clean solvent passes back to the cleaning machine for recirculation. After continued washing operations the filter bags become clogged with filter aid, grease, etc., and it becomes necessary for them to be cleaned. This may be accomplished by backwashing the filter, that is forcing the solvent through the filter bags in a reverse direction, and the dirt cake or sludge thereon is removed and settles on a filter bed located in the lower portion of the filter. After several backwashes it becomes necessary to remove the accumulation of sludge on the sludge bed. It is advantageous to remove the sludge from the filter in a dry state. This is also true of the filter means or bags. The sludge and bags retain a great amount of solvent which is very costly and if inhaled to any great extent may prove injurious to the health of an operator. The filter bags and sludge are more easily removed when in the said dry state and the filter is more easily and conveniently cleaned.

The filter and method of recovering liquids to be described herein have general applicability, although they are intended primarily for use in the dry cleaning industry.

As previously mentioned, the dry cleaning solvent is an expensive liquid and its recovery from the garments and clothes which have been cleaned is an economical procedure. The equipment or parts for recovering the liquid from the clothes which have been cleaned can also be used in the recovery of the liquid from the filter, thereby simplifying materially the combined structure.

A dry cleaning machine connected with a filter is illustrated in Figure 1. The dry cleaning machine is enclosed in a main casing 10 which is subdivided into a drum or wheel casing 11 in which the dry cleaning drum or wheel 12 is mounted for rotation or oscillation, or both. The casing 10 also has a partition 13 in which there is a drain 14, and the partition provides a cover for a sump or storage tank 15 at the bottom of the dry cleaning machine or casing. A door 16 provides access to the dry cleaning drum 12.

A condenser or condensing means 20 and a heating means 21 are also preferably located within the dry cleaning casing 10. A partition 22 separates the heating means from the condensing means, whereby a path of travel for liquid reclaiming air is provided from the condensing means to the heating means, as will appear more fully hereinafter. The heating means is shown as a pipe coil through which a heating medium passes. Any suitable heating means is contemplated. The condensing means is also shown as a pipe coil through which a cooling medium passes. It is understood that any suitable condensing means may be used. At one end of the condensing means, or the chamber containing the condensing coils, a duct 23 leads to the center of the drum 12, and an outlet duct 24 leads from the drum casing 12 to a blower 25 which is driven in any suitable fashion, such as by the motor 26. A lint filter 27 may also be provided and its purpose will be explained hereinafter. A pressure release valve 28 is provided to prevent excess pressures or vacuum within the dry cleaning machine and hence within the entire system.

A valve means 30, illustrated as a clapper valve having two positions, controls the flow of solvent reclaiming air. In one or the upper position of the valve means 30, shown in dotted lines, a flow of air is set up by the blower 25 through the valve means 30, the lint filter 27, the condenser means or condenser 20, heating means or heater 21, duct 23, the dry cleaner drum 12, duct 24, and back to the blower 25. In this circulation of air, which is indicated by broken line arrows, the air is heated by the heater and, in passing through the dry cleaner drum 12 and the clothes which have been cleaned, vaporizes the solvent in the garments and dries them out while in the drum. The air with solvent or solvent vapor entrained therewith passes through the lint filter to remove any lint which may be picked up from the garments, after which the air passes through the condenser where the solvent is condensed. The air circulates in this fashion until the garments are dry and all solvent is reclaimed therefrom. The condensed solvent drips down from the condenser and passes through the drain 14 into the storage tank 15.

The valve means 30 also controls a flow of air through a connecting conduit or pipe 34 from the blower 25 to a solvent filter, and a return connecting conduit or pipe 35 returns the air from the filter to the dry cleaner casing 10. A valve 37 prevents solvent from going through the conduit 35. With the valve means 30 in its other or lower position, the passage to the conduit 34 is opened and the passage to the lint filter 27 is closed so that the air from the blower 25 now flows through the conduit 34 to the filter. A valve 36 in the conduit 34 and a valve 37 in the conduit 35 are located adjacent the filter so that liquid or solvent is prevented from flowing from the filter into their respective conduits. The connections for the flow of air through the filter may be made at any suitable part of the filter, however it is desirable to have the air flow through the filter means in order to more thoroughly dry the same.

The air from the blower circulates through the filter and picks up or vaporizes any solvent therein, and particularly the solvent in the sludge and filter bags, and flows back through the conduit 35, through the condenser 20, over the heating coils 21, duct 23, dry cleaner drum 12 which is now free from garments, duct 24, and back to the blower. In this circulation, the heated air, with vaporized liquid or solvent which has been picked up in the filter, is carried through the condenser 20 where the solvent is condensed. This circulation of air is continued until all the solvent in the filter has been vaporized and reclaimed. The solvent drips off the condenser and passes through the drain 14 to the storage tank 15.

It will be observed that the blower 25, condensing means 20, and the heating means 21 serve a double purpose both for reclaiming solvent from garments which have been cleaned and for reclaiming solvent from the filter, including solvent contained in the sludge in the filter, as will be described. In the reclaiming of solvent from the filter, it is not necessary to have the air pass through the dry cleaning drum 12. However, since the cleaning of the filter and reclaiming of solvent therefrom takes place when there are no garments in the dry cleaning drum, there is no disadvantage in passing the air therethrough and it saves the provision of conduit and valve means for by-passing the drum in the circulation of air through the filter.

The filter, illustrated in detail in Figures 2 and 3, comprises a casing 40 having an open top which is sealed by a cover 41 held in place by bolts 42. The open top permits access to the inside of the casing and particularly to the filter bag means for cleaning, repairing and replacement thereof. A support or standard 43 carries the filter above the floor.

The filter has an outer casing 46 which is spaced from the casing 40 and forms a steam jacket for the filter. A steam inlet pipe 47, controlled by an inlet valve 48, is connected with the upper part of the steam jacket, and an outlet pipe 49 is connected with the bottom of the jacket.

The inner casing 40 has a solvent inlet pipe 52 which is controlled by a valve 53. Filter means 54, which may be in the form of spaced filter bags, are located in the upper portion of the inner casing, which filter bags are connected with a header 55. The filter means may be of any suitable construction such as a wire screen form covered with a filter bag. An outlet pipe 56, controlled by a valve 57, connects the header with the dry cleaning machine, Figure 1, and returns the filtered solvent to the drum or wheel casing 11. The solvent outlet pipe 56 also connects the header, and hence the filter means, with the air inlet pipe 35 leading to the condenser 20 of the dry cleaning machine.

A sludge bed is formed from a screen 62 supported on a grill 63 which is located below the filter means 54 and divides the lower portion of the filter or casing 40 into an upper chamber and a lower chamber. A filter cloth 64 may be laid over the screen so that solvent in the sludge will be filtered as it drains through the sludge bed into the bottom of the filter. The sludge bed catches filter aid and sludge S as it falls from the filter means. An outlet or drain pipe 65 leads from the lower portion of the inner casing 40 of the filter which branches into a pipe line 66, controlled by a valve 67, and a pipe line 68 controlled by a valve 69.

An air inlet pipe 72, controlled by a valve 73, is connected with the upper part of the filter casing 40 for the purpose of admitting air under pressure thereto. A second air inlet pipe 74, controlled by a valve 75, is connected with the lower chamber of the filter, or below the sludge bed. The purpose of these air lines will be explained hereinafter.

The filter and dry cleaning machine operate in a manner now to be described. Solvent is pumped by a pump 78 into the filter from the storage tank 15 through a pipe 79 and pipe 52 until the filter is full. A valve 80 in the pipe 79 controls the flow of solvent therethrough. An air vent 83 permits the excess air and in fact all of the air in the filter to escape therefrom until the filter is entirely full of solvent, whereupon the vent is closed. The air vent preferably is connected with the dry cleaning machine so that any solvent passing therethrough remains in the system and is not lost. The vent dissipates air from the filter so that it will not pocket therein. The filter, therefore, can be filled with solvent to completely cover the filter bags. The solvent then flows through the filter means 54, header 55, pipe 56 into the dry cleaning machine, or particularly the drum casing 11, until a desired level of solvent is obtained. Filter aid may now be thrown into the drum 12 which has been loaded with soiled garments to be cleaned. The valve 80 is then closed and a valve 81 is opened in a pipe 82 which connects the lower part of the drum casing with the pump 78 so that dirty solvent is now pumped into the filter through the pipes 82 and 52 from the dry cleaning machine and its path is indicated by heavy arrows. The pump preferably continually circulates the solvent from the drum casing to the filter and, as it flows through the filter bags, it deposits thereon the dirt, grease, and filter aid picked up in the washer drum during the washing or dry cleaning operation. The filtered and cleaned solvent passes to the header 55, through the open valve 57, and pipe 56 back to the dry cleaning machine. When the garments in the drum 12 have been cleaned, the solvent is pumped or drained out of the drum casing 11 and the garments dried by circulation of air, as previously described.

The filtering operation is repeated or continues during the dry cleaning operation until the filter means or bags 54 become clogged with dirt and filter aid so that it becomes necessary to clean the same. The time for filter bag cleaning can be determined from a pressure gauge 84 showing the pressure delivered by the pump. A high gauge reading shows that the filter bags are clogged. The cleaning operation consists in backwashing or reversing the flow of solvent through the filter means and into the filter proper which dislodges the dirt and filter aid or sludge S that adhere to the bags and the sludge falls to the sludge bed where it accumulates.

After repeated operations as described above, it becomes necessary to clean out the filter and reclaim any solvent that is held by or absorbed in the sludge. To accomplish this, a solvent drain valve 67 is opened and all of the solvent is drained or pumped from the filter into a suitable tank, or the valve 69 may be opened and the solvent drained or forced to the storage tank 15 after which the valve is closed. All of the valves leading from the filter are then closed and air pressure from two to five pounds is admitted from pipe 72 to the top of the filter. This air pressure presses down upon any solvent which may be upon the top of the sludge bed and forces it through the bed to the bottom of the filter where it is drained off through pipe 66 or 68. When all of the solvent has been forced through the sludge bed, the air pressure presses down upon the sludge bed and squeezes out additional solvent embedded therein which drains out. When no more solvent flows from the drain pipe, the air valve 73 and drain valve 67 or 69 are closed and all of the other valves remain closed. It is clear that solvent may be removed from the sludge by applying a vacuum below the sludge bed. In other words, a differential pressure may be used in the filter to remove solvent entrained or contained in the sludge on the sludge bed.

Air pressure from two to five pounds is applied to the filter in the lower chamber underneath the sludge bed by opening valve 75, which pressure is applied long enough to bulge up the flexible filter cloth 64, as shown in dotted lines, and thereby break up the more or less solid sludge cake thereupon. It is clear that vacuum pressure applied above the sludge bed will balloon or bulge up the filter cloth. In other words, a differential pressure with respect to atmosphere may be used for breaking up the sludge. Any other suitable means or method for breaking up the sludge is contemplated.

The filter is then dried out for the purpose of making the sludge easier and cleaner to handle, and also to reclaim all the solvent that can be recovered. All valves are closed and the air inlet valve 36 in the air inlet pipe 34 and valve 37 in the air outlet pipe 35 are opened. The two-way valve 30 is also moved to its position which opens the pipe 34 to the blower and closes the connection to the lint filter 27.

Heated air is blown by the blower 25 through the pipe 34 and it circulates through the filter. The complete path of the air is indicated with a solid tailed arrow. At about the same time that air is blown through the filter, the steam inlet valve 48 in the steam inlet line 47 is opened and steam flows into the steam jacket between casings 40 and 46 and heats the entire filter, drying out the filter bags 54 and the sludge S. The steam heated filter also heats the air flowing therethrough and hence constitutes an air heating and solvent vaporizing means as well. The air coming in through pipe 34 circulates around the filter and in contact with the broken up sludge S upon the sludge bed and passes through the filter bags 54. The air picks up solvent vapor in the sludge and filter bags and passes to header 55 and out through pipe 56 and the branch pipe 35 to the condenser or condenser means 20 in the dry cleaning machine.

The solvent laden air, when passing through this condenser, loses its solvent vapors and the condensate flows to the storage tank 15 through the drain 14. The fact that the entire filter is heated helps greatly in vaporizing the liquid or solvent in the filter bags and the sludge S. After the air has passed through the condenser, it passes through the heater 21 where the air is again heated, duct 23, drum 12, duct 24, and back to the blower 25, after which it is again blown through the pipe 34 to the filter where it again circulates to pick up more solvent.

It has been described that the air in flowing from the heater to the blower also passes through the washer drum. It is not necessary for the air to pass through the drum and it does so only to avoid the use of additional valves and connections which would otherwise be needed to by-pass the drum. Again, the air outlet pipe 35 need not be connected with the header 55, but may be connected to the filter at some other point, such as to the drain pipe 66 or 68; however, it is better to have the air pass through the filter means in order to thoroughly dry the same and not carry dust, etc., to the condenser.

After the sludge and filter have been thoroughly dried and all the solvent has been reclaimed, the valves are closed and a clean-out door 86 is opened into the filter, and this dry sludge, on the sludge bed, is removed. The cover 41 is also opened and the filter bags and the cloth filter 64 are removed, cleaned, repaired if necessary, and replaced. Upon replacing the cover 41 and closing the clean-out door 86, the filter is then entirely clean and ready for another series of filtering operations.

The filter particularly described is merely illustrative of a preferred form thereof. Any construction of filter or filter system suitable for connection and use with a dry cleaning machine is contemplated.

This invention is presented to fill a need for improvements in a Method and apparatus for recovering liquids. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. The process of recovering a liquid from a filter system having filter means and an accumulation of sludge which process also dries out said sludge and filter means for cleanliness and convenience in handling which comprises circulating air under pressure through the filter system in contact with the filter means and the sludge so that the liquid is carried off with the air, separating the liquid from the air, and venting air from the top of the filter system to prevent the system from becoming air-bound.

2. The process of recovering a liquid from a filter system having filter bag means and an accumulation of sludge which process also dries out said sludge and filter means for cleanliness and convenience in handling same which comprises reversing the flow of liquid in the filter to dislodge the filtered sludge from the filter bag means, passing heated air under pressure through the filter system so that it comes in contact with the filter means and the sludge and the liquid is carried off with the air, separating the liquid from the air, and venting air from the top of the filter system to prevent the system from becoming air-bound.

3. The process of recovering a liquid from a filter system having a filter means and an accumulation of sludge which process also dries out said sludge and filter means to make for cleanliness and convenience in handling same which comprises applying air under pressure to press the liquid from the sludge, passing air under pressure through the filter so that it comes in contact with the filter means and the sludge and the liquid is carried off with the air, separating the liquid from the air, and venting air from the top of the filter system to prevent the system from becoming air-bound.

4. The process of recovering a liquid from a filter system having a sludge bed means and a filter means which process also dries out the sludge and filter means for cleanliness and convenience in handling the same which comprises passing heated air under pressure to circulate in the filter and pass through one of the aforesaid means and carry off the liquid with the air, separating the liquid from the air, and venting air from the top of the filter system to prevent the system from becoming air bound.

5. The process of recovering a liquid from sludge and filter means in a filter, to save the liquid and dry out said sludge and filter means for cleanliness and convenience in handling same which comprises passing heated air under sufficient pressure through the filter so that the air picks up the liquid from the sludge, then passing the heated air through the filter means until the sludge and filter means are both dry, separating the liquid from the air, and venting air from the top of the filter system to prevent the system from becoming air-bound.

6. The process of recovering a liquid from a filter system having a filter means and an accumulation of sludge on a sludge bed which process also dries out said sludge and filter means to make for cleanliness and convenience in handling same which comprises applying air under pressure below the sludge bed to break up the sludge on the sludge bed, passing air under pressure to circulate through the filter so that it comes in contact with the filter means and the sludge and carries off the liquid with the air, separating the liquid from the air, and venting air from the top of the filter system to prevent the system from becoming air-bound.

7. The process of recovering a liquid from a filter system having a filter means and an accumulation of sludge on a sludge bed which process also dries out said sludge and filter means to make for cleanliness and convenience in handling same which comprises applying air under pressure to press the liquid from the sludge, applying air under pressure below the sludge bed to break up the sludge on the sludge bed, passing air under pressure to circulate through the filter so that it comes in contact with the filter means and the sludge and carries off the liquid with the air, separating the liquid from the air, and venting air from the top of the filter system to prevent the system from becoming air-bound.

8. The process of recovering a liquid from a filter system having a filter means and an accumulation of sludge upon a sludge bed which process also dries out said sludge and filter means to make for cleanliness and convenience in handling same which comprises applying air under pressure below the sludge bed to break up the sludge upon the sludge bed, passing air under pressure to circulate through the filter so that it comes in contact with the sludge and then passes through the filter means and carries off the liquid with the air, separating the liquid from the air, and venting air from the top of the filter system to prevent the system from becoming airbound.

9. A liquid filter comprising a casing, a filter means therein, condensing means, heating means, a blower, connections conducting liquid to the filter and through the filter means, and air connections with the casing to pass air from the blower through the filter, the condensing means, the heating means, and back to the blower, whereby the liquid picked up by the air in the filter is reclaimed by the condensing means.

10. A liquid filter comprising a casing, a filter means therein, condensing means, heating means, a blower, a liquid inlet connection for conducting liquid to the filter, a liquid outlet connection from the filter means whereby liquid must pass through the filter means, an air connection from the blower to the filter to pass air from the blower to the filter, and an air connection from the liquid outlet connection to conduct air to the condensing means, the heating means, and back to the blower whereby the liquid picked up in the filter by the air is reclaimed in the condensing means.

11. The process of recovering liquid from a bed of sludge in an enclosed filter which sludge is accumulated on a flexible filter sheet comprising subjecting the top of the bed of sludge to an air pressure greater than atmospheric and forcing the liquid suspended in the sludge through the sludge and the filter sheet, releasing the aforesaid air pressure, applying air pressure below the filter sheet to balloon the same and break up said sludge for convenient drying, circulating air in the filter in contact with said sludge, and recovering the liquid from the air.

12. The process of recovering liquid from a bed of sludge in an enclosed filter which sludge is accumulated on a flexible filter sheet comprising subjecting the sludge to a differential pressure with respect to atmosphere and forcing the liquid suspended in the sludge therefrom and distorting or breaking up the sludge for convenient drying, circulating air in contact with the sludge so that the liquid is picked up by the air, and recovering the liquid from the air.

13. The process of recovering liquid from a bed of sludge in an enclosed filter which sludge is accumulated on a filter sheet comprising subjecting the sludge to an air pressure to first remove liquid suspended in the sludge, applying air pressure to distort or break up the sludge for convenient drying, circulating air in contact with the sludge for complete drying, and separating the liquid from the air.

14. The process of recovering liquid from an enclosed filter and a bed of sludge therein comprising compressing the sludge and forcing the liquid suspended in the sludge therefrom by applying air pressure greater than atmospheric above the accumulation of sludge, breaking up said sludge bed, passing air through the filter in contact with said sludge to dry out the same, and separating the liquid from the air.

15. The process of recovering liquid from a bed of sludge accumulated in a filter apparatus consisting in subjecting the bed of sludge within the filter to unequal air pressures on opposite sides thereof, whereby the bed is distorted, flexed and broken up and air passed through the bed, and condensing the liquid absorbed by the air passing through or coming in contact with the bed.

16. The process of recovering liquid from a bed of sludge accumulated on a flexible screen in a filter apparatus, consisting in subjecting the bed of sludge to unequal air pressures on opposite sides thereof with the greater air pressure on the side opposite to that on which the screen is located, whereby the liquid trapped in the sludge is absorbed from the bed by the air passed through the bed to the other side of the bed, and the bed of sludge compressed against the sheet to squeeze the liquid therein out of the same, and condensing the liquid from the air passed through the bed.

17. The process of recovering liquid from a bed of sludge accumulated in a filter apparatus and supported on a flexible screen consisting in applying unequal air pressures to opposite sides of the bed to bulge the screen and the bed and break up the bed, and condensing the liquid from the air passed through the broken-up bed.

18. The process of recovering liquid from a bed of sludge accumulated on a flexible screen in a filter apparatus, consisting in subjecting the bed of sludge to unequal air pressures on opposite sides thereof with the greater pressure first on the side opposite to that on which the screen is located, whereby the liquid trapped in the sludge is absorbed from the bed, and the bed compressed against the screen to squeeze the liquid therefrom, then applying unequal air pressure to opposite sides of the bed of sludge with the greater pressure on the side on which the screen is located to bulge the screen and break up the bed to facilitate the drying and removal of the sludge, and condensing the liquid from the air passed through or in contact with the bed.

19. In a liquid filter apparatus which includes a casing, filter means therein, a sludge bed support below the filter means including a screen on which the sludge accumulates, and means for subjecting opposite sides of the filter screen with the sludge thereon to unequal pressures to cause the screen to balloon and break up the sludge accumulated on the support.

ERNEST DAVIS.